(12) United States Patent
Yam

(10) Patent No.: US 6,950,232 B1
(45) Date of Patent: Sep. 27, 2005

(54) GAIN CLAMPED THULIUM-DOPED FIBER AMPLIFICATION

(75) Inventor: Scott Sze Hong Yam, Stanford, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 298 days.

(21) Appl. No.: 10/390,464

(22) Filed: Mar. 17, 2003

(51) Int. Cl.[7] ............................................. H04B 10/12
(52) U.S. Cl. ............................. 359/341.5; 359/337.1; 359/341.4
(58) Field of Search ..................... 359/341.4, 337.11, 359/341.5

(56) References Cited

U.S. PATENT DOCUMENTS

| | | | |
|---|---|---|---|
| 5,239,607 A | * | 8/1993 | da Silva et al. ............ 385/122 |
| 5,406,410 A | * | 4/1995 | Hanna et al. ............ 359/341.5 |
| 6,016,218 A | * | 1/2000 | Jo et al. ................ 359/341.33 |
| 6,175,436 B1 | * | 1/2001 | Jackel ........................ 359/349 |
| 6,201,637 B1 | * | 3/2001 | Nilsson et al. ......... 359/341.33 |
| 6,307,667 B1 | * | 10/2001 | Liang .......................... 359/337 |
| 6,356,385 B1 | * | 3/2002 | Digonnet et al. ........... 359/337 |
| 6,501,594 B1 | * | 12/2002 | Hwang et al. ......... 359/341.32 |
| 6,570,701 B1 | * | 5/2003 | Hwang et al. .......... 359/341.1 |
| 6,721,092 B2 | * | 4/2004 | Aozasa et al. .......... 359/341.5 |
| 2002/0021882 A1 | * | 2/2002 | Wyatt et al. ................ 385/142 |
| 2002/0085269 A1 | * | 7/2002 | Roy et al. ................ 359/341.1 |
| 2003/0030892 A1 | * | 2/2003 | Dennis et al. ........... 359/341.1 |

OTHER PUBLICATIONS

Subramaniam, T. et al.,"All-optical gain clamped erbium-doped fiber-rign lasing amplifier with laser filtering technique", IEEE Photonics Technology Letters, vol. 13, #8, pp. 785-787, Aug. 2001.*

Lee, Won Jae; Lee, Choong Hee, Byun Jae-Oh, Jonghan, Park and Park, Namkyoo, "Gain Excursion & Tilt Compensation Algorithm for TDFA using 1.4 μm/1.5 μm Dual Wavelength Pump Control," Thursday Afternoon/OFC 2002 ThZ3 4:45 p.m., pp. 571-572.

* cited by examiner

Primary Examiner—Bernarr E. Gregory
Assistant Examiner—Eric Bolda

(57) ABSTRACT

An optical amplifier system is disclosed comprising a Thulium-doped fiber span, a pump system, and a feedback loop. The Thulium-doped fiber span receives input optical signals. The pump system pumps light having a wavelength in the range of 1049 nm to 1060 nm onto the Thulium-doped fiber span. The light amplifies the input optical signals to generate amplified optical signals. The Thulium-doped fiber span transfers the amplified optical signals. The feedback loop receives at least one wavelength of amplified emissions from the Thulium-doped fiber span. The feedback loop generates optical feedback signals based the wavelength or wavelengths of the amplified emissions. The feedback loop adds the optical feedback signals to the input optical signals to provide clamping of a gain in the amplified optical signals.

20 Claims, 4 Drawing Sheets

GAIN CLAMPED THULIUM-DOPED FIBER AMPLIFICATION

BACKGROUND OF THE INVENTION

1. Field of the Invention

The invention is related to the field of communication systems, and in particular, to systems and methods of providing gain clamped Thulium-doped fiber amplification of optical signals.

2. Statement of the Problem

Many communication companies use fiber optic cabling as a media for transmitting data because of its high-bandwidth capacity. Fiber optic cables reliably transport optical signals over long distances. Over a distance, optical signals attenuate in the fiber due to Rayleigh scattering. The attenuation may be recovered by an optical amplifier. However, the optical amplifier adds noise to the optical signals. The noise accumulation on the optical signals can especially be a problem for ultra long haul transmissions.

Optical amplifiers may be discrete amplifiers or distributed amplifiers. Distributed amplifiers use the transmission fiber carrying the optical signals as a gain medium. Discrete amplifiers do not use the transmission fiber as a gain medium, but use another type of fiber or component as the gain medium.

One type of discrete amplifier is an Erbium-Doped Fiber Amplifier (EDFA). In an EDFA, an Erbium-doped fiber receives optical signals from a transmission fiber. A Raman fiber pump transmits light having a wavelength of 980 nm onto the Erbium-doped fiber concurrently as the optical signals travel over the Erbium-doped fiber. The properties of the Erbium-doped fiber act to absorb the pumped light and generate a gain in the optical signals using the absorbed light.

To control the gain generated by a C-band EDFA, the EDFA includes a feedback loop. A fiber Bragg grating or another type of filter separate one or more wavelengths out of the amplified optical signals. The separated wavelength or wavelengths comprise a feedback signal. The feedback loop receives the feedback signal and combines the feedback signal with the optical signals to be amplified. The feedback loop helps to clamp the gain of the EDFA at a constant level over the C-band or a portion of the C-band.

Unfortunately, traditional EDFA's have a limit on the gain bandwidth they can generate. An EDFA with a 980 nm pump amplifies the C-band. The C-band refers to optical signals having wavelengths in the range of 1530 nm to 1560 nm. The C-band may not provide enough bandwidth as the demand for capacity increases.

To increase capacity, the S-band can also be used. The S-band refers to optical signals having wavelengths in the range of 1450 nm to 1480 nm. Thulium-doped fiber amplifiers (TDFA) have been developed to amplify the S-band. In a TDFA, a Thulium-doped fiber receives optical signals from a transmission fiber. A Raman fiber pump transmits light onto the Thulium-doped fiber concurrently as the optical signals travel over the Thulium-doped fiber. The properties of the Thulium-doped fiber act to absorb the pumped light and generate a gain in the S-band using the absorbed light.

Inherent properties of the Thulium-doped fiber make it difficult to control the gain generated by the TDFA. In one prior art TDFA, three pumps (1421 nm, 1427 nm, and 1434 nm) are used to pump a Thulium-doped fiber. The input optical signals are monitored and the powers of the three pumps are adjusted based on the input optical signals to control the gain generated by the TDFA. This prior art TDFA was provided in a paper by Won Jae Lee et. al. entitled "Gain excursion & tilt compensation algorithm for TDFA using 1.4 $\mu$m/1.5 $\mu$m Dual Wavelength Pump Control" published in OFC 2002 (Lee Paper).

One problem with the TDFA described in the Lee Paper is that monitoring the input optical signals and adjusting the pumps based on the input optical signals may be a difficult and inaccurate method of controlling the gain of the TDFA. Another problem with the TDFA in the Lee Paper and other TDFA configurations is that the gain of the TDFA is not clamped. System designers may have a difficult time using the current TDFAs because the designers may not be able to anticipate the gain of the TDFA.

SUMMARY OF THE SOLUTION

One example of the invention helps solve the above problems with an optical amplifier system comprising a Thulium-doped fiber span, a pump system, and a feedback loop. The Thulium-doped fiber span receives input optical signals. The pump system pumps light having a wavelength in the range of 1049 nm to 1060 nm onto the Thulium-doped fiber span. The light from the pump system amplifies the input optical signals to generate amplified optical signals. The feedback loop receives one or more wavelength of amplified emissions from the Thulium-doped fiber span. The feedback loop generates optical feedback signals based on the wavelength or wavelengths of the amplified emissions. The feedback loop adds the optical feedback signals to the input optical signals to provide clamping of a gain in the amplified optical signals.

The optical amplifier system advantageously provides gain clamping of a Thulium-doped fiber amplifier (TDFA). Gain clamping allows network designers to anticipate the gain of the TDFA making design of the network easier. The optical amplifier system also provides a larger gain clamped wavelength range for a TDFA. Also, the gain generated by the optical amplifier system due to the feedback loop is shifted to longer wavelengths. The longer wavelengths experience less fiber attenuation.

The invention may include other examples described below.

DESCRIPTION OF THE DRAWINGS

The same reference number represents the same element on all drawings.

DETAILED DESCRIPTION OF THE INVENTION

FIGS. 1–6 and the following description depict specific examples of optical amplifier systems to teach those skilled in the art how to make and use the best mode of the invention. For the purpose of teaching inventive principles, some conventional aspects of the optical amplifier systems have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
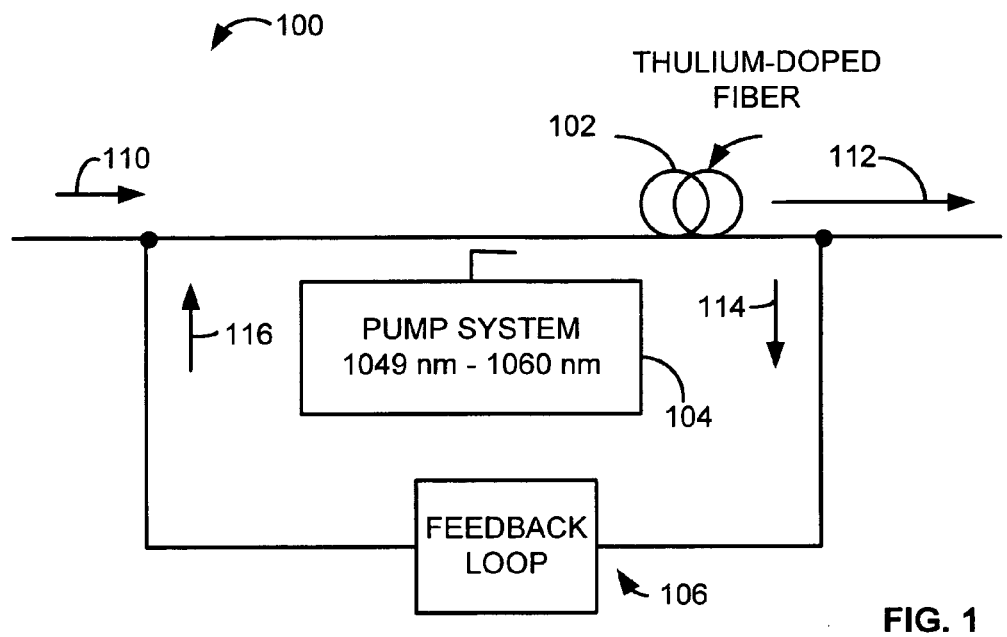
FIG. 1 illustrates an optical amplifier system in an example of the invention.
Figure 2:
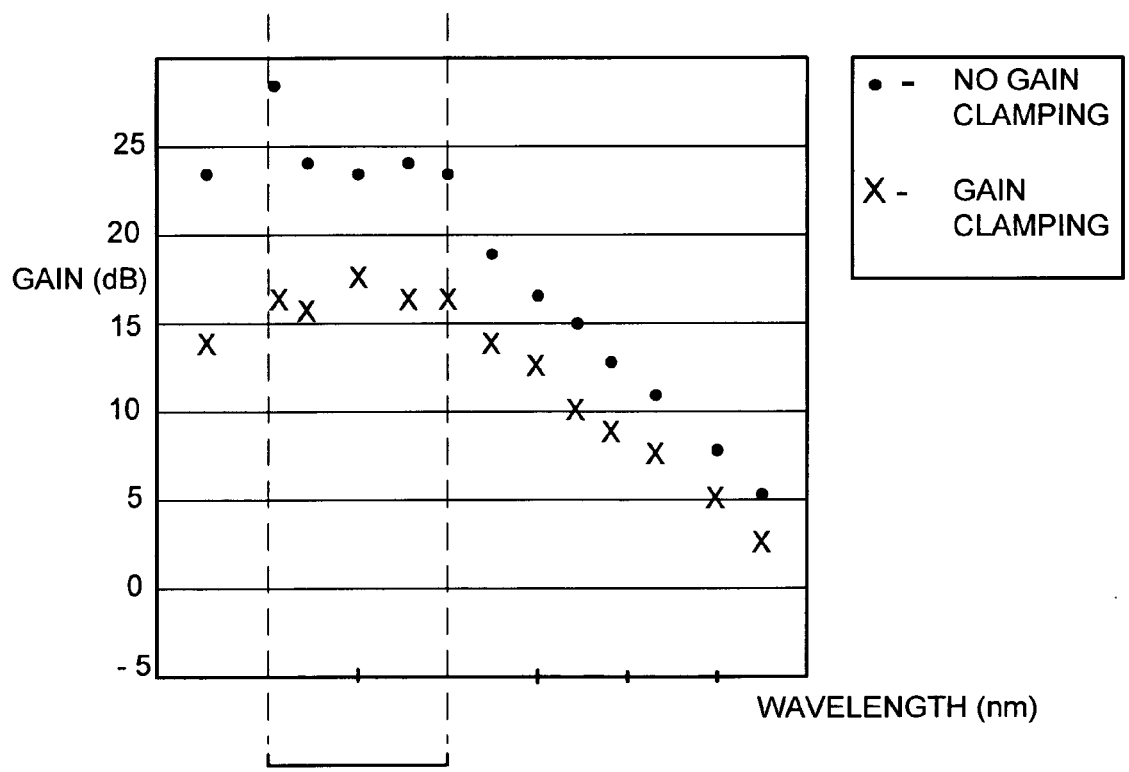
FIG. 2 illustrates a gain generated by the optical amplifier system in FIG. 1 in an example of the invention.

Optical Amplifier System—FIGS. 1–2

FIG. 1 illustrates an optical amplifier system 100 in an example of the invention. Optical amplifier system 100 is comprised of a Thulium-doped fiber span 102, a pump system 104, and a feedback loop 106. Pump system 104 is coupled to Thulium-doped fiber span 102. Feedback loop 106 is coupled to an input end of Thulium-doped fiber span 102 and an output end of Thulium-doped fiber span 102.

The following definitions may help to clarify the invention. A Thulium-doped fiber span comprises any length of optical fiber doped with Thulium. A pump system comprises any system, device, or component configured to pump light onto an optical fiber. A feedback loop comprises any system, device, or element configured to receive one or more wavelengths of amplified emissions, and add the wavelength or wavelengths of the amplified optical signals to input optical signals being amplified. The feedback loop may attenuate or otherwise alter the wavelengths of the amplified emissions before adding them to the input optical signals. Amplified emissions comprise any noise, light, wavelengths, or any other emissions generated in a Thulium-doped fiber span during amplification of optical signals. One example of amplified emissions is Amplified Spontaneous Emission (ASE) noise. Gain clamping refers to maintaining a constant gain of optical signals over an input power range over a wavelength range.

In operation, Thulium-doped fiber span 102 receives input optical signals 110. Pump system 104 pumps light having a wavelength in the range of 1049 nm to 1060 nm onto Thulium-doped fiber span 102. The light amplifies the input optical signals 110 traveling over Thulium-doped fiber span 102 to generate amplified optical signals 112. Thulium-doped fiber span 102 then transfers the amplified optical signals 112.

Feedback loop 106 receives one or more wavelength 114 of amplified emissions from Thulium-doped fiber span 102. The amplified emissions are generated in Thulium-doped fiber span 102 during amplification of the input optical signals 110. Feedback loop 106 generates optical feedback signals 116 based on the wavelength or wavelengths 114 of the amplified emissions. Feedback loop 106 may attenuate or otherwise alter the wavelength or wavelengths 114 of the amplified emissions to generate the optical feedback signals 116. Feedback loop 106 then adds the optical feedback signals 116 to the input optical signals 110 to provide clamping of a gain in the amplified optical signals 112. Based on the above description, one skilled in the art would be able to modify existing optical amplifier systems to make optical amplifier system 100.

FIG. 2 illustrates a gain generated by optical amplifier system 100 in an example of the invention. An "x" on FIG. 2 illustrates a sample of the gain generated by optical amplifier system 100. A black dot on FIG. 2 illustrates a sample of a gain generated by a Thulium-doped fiber amplifier (TDFA) that does not have gain clamping. Optical amplifier system 100 advantageously clamps the gain over a wavelength range. In this example, optical amplifier system 100 clamps the gain at about 16 dB for a range greater than 10 nm. The wavelength range of the clamped gain may be as large as 20 nm or larger. This is compared to the gain of a TDFA without gain clamping, which varies over the wavelengths range.

Example—FIGS. 3–6

Figure 3:
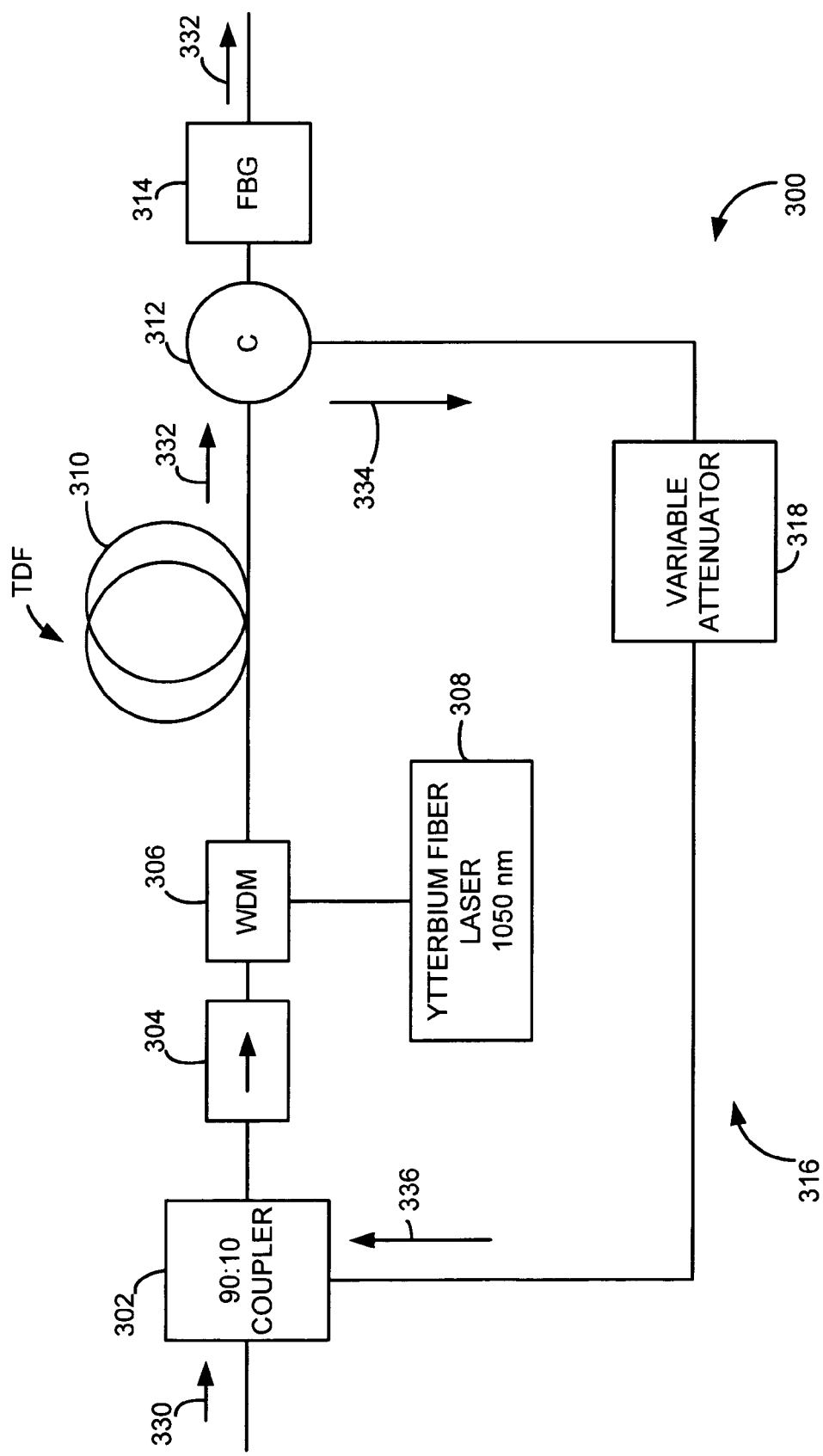
FIG. 3 illustrates an optical amplifier system in an example of the invention.

FIG. 3 illustrates another example of an optical amplifier system 300 in an example of the invention. Optical amplifier system 300 is comprised of a 90:10 coupler 302, an isolator 304, a Wavelength Division Multiplexer (WDM) 306; a Ytterbium fiber laser 308, a Thulium-doped fiber span 310, a circulator 312, a fiber Bragg grating 314, and a feedback loop 316. Feedback loop 316 includes a variable attenuator 318. 90:10 coupler 302 is coupled to isolator 304 and feedback loop 316. Isolator 304 is coupled to WDM 306. WDM 306 is coupled to Ytterbium fiber laser 308 and Thulium-doped fiber span 310. Thulium-doped fiber span 310 is coupled to circulator 312. Circulator 312 is coupled to feedback loop 316 and fiber Bragg grating 314.

Thulium-doped fiber span 310 comprises a Fluoride-based fiber span doped with Thulium. More particularly, Thulium-doped fiber span 310 comprises a ZBLAN-based fiber span. Thulium-doped fiber span 310 has a length of about 20 meters and has the following characteristics: 2000 parts per million (ppm) of Thulium, 0.24 numerical aperature, and 6 dB loss at 1400 nm.

Ytterbium fiber laser 308 is configured to pump a 1050 nm light signal onto Thulium-doped fiber span 310. Ytterbium fiber laser 308 is set at a power of about 660 mW. For this example, Ytterbium fiber laser 308 is the only pump needed obtain the desired results. In other embodiments of the invention, optical amplifier system 300 may also include another pump configured to pump a 1550 nm light signal onto Thulium-doped fiber span 310. The other pump may comprise a laser diode having a power of about 10 mW.

In operation, 90:10 coupler 302 receives input optical signals 330. For the first iteration, 90:10 coupler 302 transfers the input optical signals 330 through isolator 304 to Thulium-doped fiber span 310. Isolator 304 prevents unwanted optical signals from traveling backward into the fiber gain medium. Concurrently, Ytterbium fiber laser 308 forward pumps light having a wavelength of about 1050 nm onto Thulium-doped fiber span 310 through WDM 306. The 1050 nm light amplifies the input optical signals 330 to generate amplified optical signals 332. Thulium-doped fiber span 310 transfers the amplified optical signals 332 to circulator 312.

The light in the Thulium-doped fiber span 310 also generates Amplified Spontaneous Emission (ASE) noise in the S-band. Circulator 312 and fiber Bragg grating 314 selects one or more wavelengths 334 of the ASE for transfer over feedback loop 316. In this example, the wavelength 334 of the ASE is about 1460 nm. Fiber Bragg grating 314 usually selects a wavelength that does not overlap with a wavelength of input optical signals 330.

Variable attenuator 318 controls the degree of clamping of the gain of the amplified optical signals 332. Variable attenuator 318 receives the 1460 nm wavelength 334 and generates optical feedback signals 336 based on the 1460 nm wavelength 334. Variable attenuator 318 may or may not attenuate the 1460 nm wavelength 334 to generate the optical feedback signals 336, depending on the desired gain clamping of the amplified optical signals 332.

90:10 coupler 302 receives the optical feedback signals 336 and adds the optical feedback signals 336 to the input optical signals 330. The optical feedback signals 336 act to clamp the gain of the amplified optical signals 332.

Figure 4:
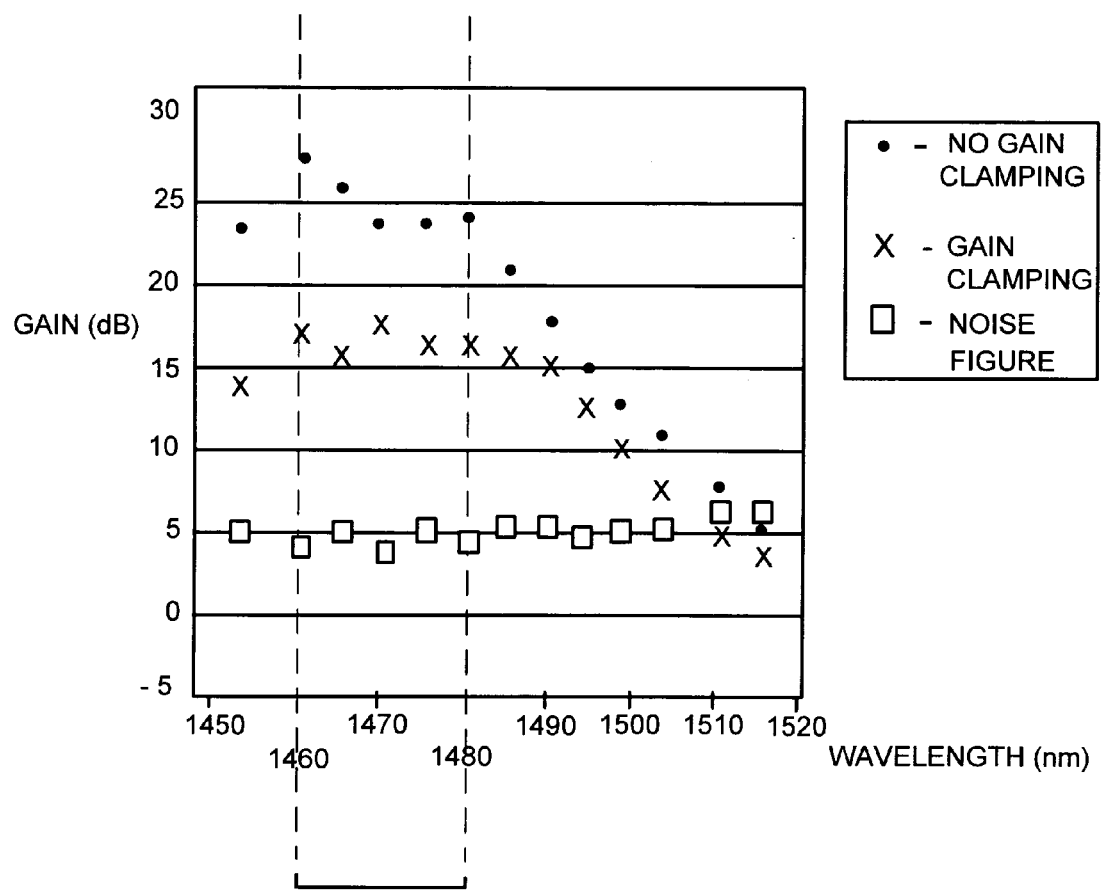
FIG. 4 illustrates a gain and noise figure generated by the optical amplifier system in FIG. 3 in an example of the invention.

FIG. 4 illustrates a gain and noise figure generated by optical amplifier system 300 in an example of the invention. An "x" on FIG. 4 illustrates a sample of the gain generated by optical amplifier system 300. A black dot on FIG. 4 illustrates a sample of a gain generated by a Thulium-doped fiber amplifier (TDFA) that does not have gain clamping. As shown by FIG. 4, the gain of a TDFA without gain clamping varies over a wavelength range between 1460 nm and 1480 nm. The gain varies from about 28 dB to 23 dB over the 20 nm wavelength range. On the other hand, optical amplifier system 300 advantageously clamps the gain over the wavelength range of 1460 nm to 1480 nm at a constant level of about 16 dB.

The wavelength range of about 1460 nm to 1480 nm comprises most of the S-band. Thus, optical amplifier system 300 advantageously provides gain clamping over the S-band so that the S-band may be used to carry data over long distances. A box in FIG. 4 illustrates a sample of a noise figure generated by optical amplifier system 300. The noise figure generated by optical amplifier system 300 is also flat and relatively low.

Figure 5:
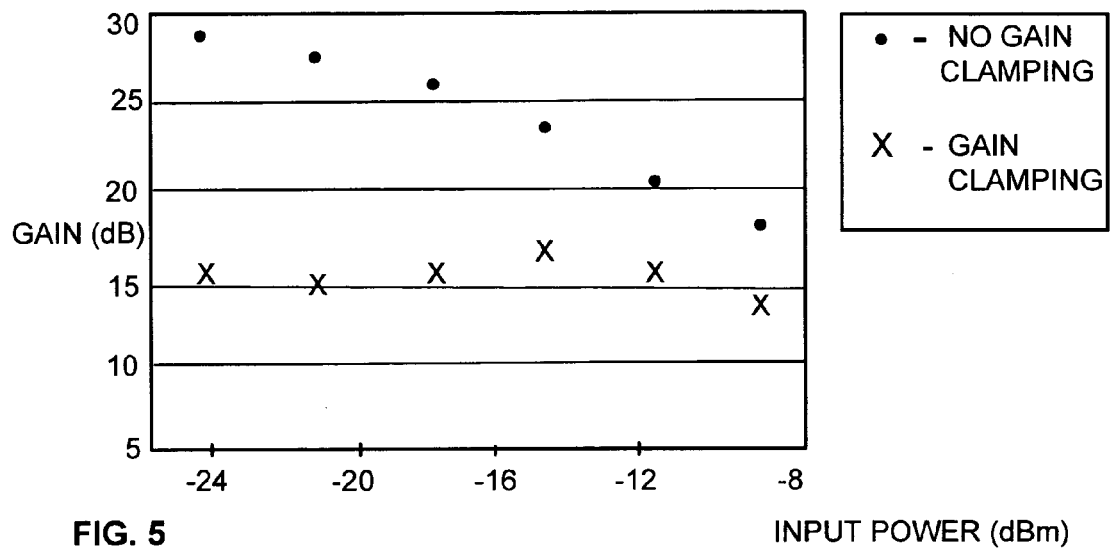
FIGS. 5 and 6 illustrate a gain generated by the optical amplifier system in FIG. 3 in an example of the invention.
Figure 6:
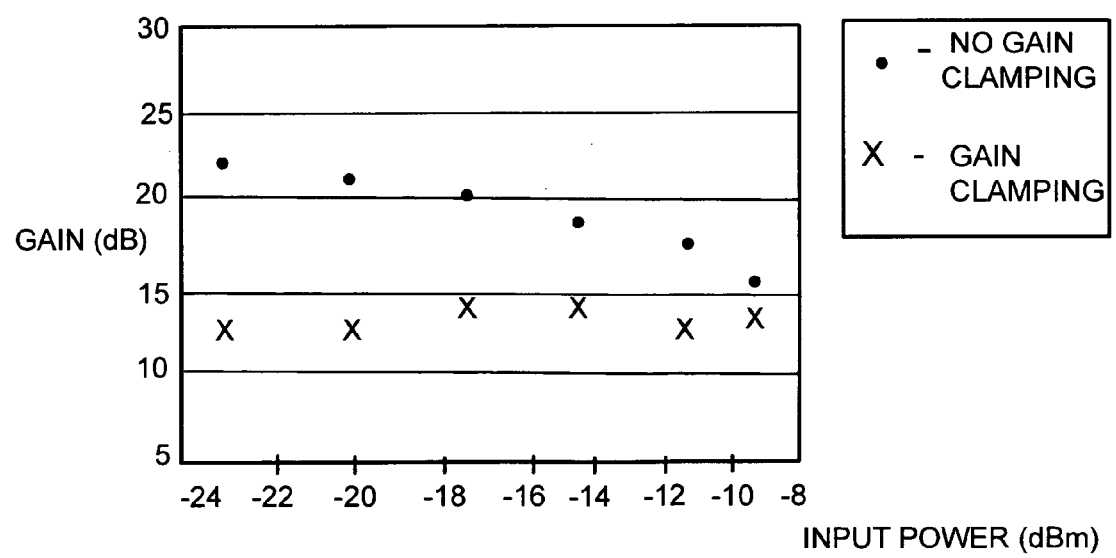

FIGS. 5 and 6 illustrate the gain generated by optical amplifier system 300 for two different wavelengths of the input optical signals 330 in an example of the invention. FIG. 5 illustrates the gain of about 15 dB generated by optical amplifier system 300 for the input optical signals 330 having a wavelength of about 1462 nm. The gain of optical amplifier system 300 is relatively flat for the input optical signals 330 having powers between −11 dBm and −24 dBm, as compared to a non-gain clamped TDFA. The maximum gain variation between −11 dBm and −24 dBm is only about 1.2 dB.

FIG. 6 illustrates the gain of about 15 dB generated by optical amplifier system 300 for the input optical signals 330 having a wavelength of about 1480 nm. The gain of optical amplifier system 300 is relatively flat for the input optical signals 330 powers between −11 dB and −24 dB, as compared to a non-gain clamped TDFA. The maximum gain variation between −11 dB and −24 dB is less than 1.0 dB.

Referring back to FIG. 3, once optical amplifier system 300 is set, variable attenuator 318 and pump system 308 do not need to be adjusted. The optical feedback signals 336 clamp the gain generated by optical amplifier system 300. Thus, optical amplifier system 300 does not need to be continually adjusted based on the input optical signals 330 like prior systems.

Optical amplifier system 300 advantageously provides automated gain control and gain clamping of a Thulium-doped fiber amplifier (TDFA). Optical amplifier system 300 provides the automated gain control without having to monitor the input conditions. Automated gain control allows for dynamic channel add-drop in an optical network without causing gain spikes to the remaining optical signals.

Moreover, optical amplifier system 300 also provides a wide gain clamped wavelength range that approaches 20 nm. Over the 20 nm gain-clamped wavelength range, optical amplifier system 300 provides a gain ripple below 1 dB while there is not appreciable noise figure degradation. The gain generated by optical amplifier system 300 due to feedback loop 316 is also shifted to longer wavelengths that experience less fiber attenuation.

What is claimed is:

1. An optical amplifier system, comprising:
    A Thulium-doped fiber span configured to receive input optical signals and transfer amplified optical signals;
    a pump system coupled to the Thulium-doped fiber span and configured to pump light having a wavelength in the range of 1049 nm to 1060 nm onto the Thulium-doped fiber span to amplify the input optical signals to generate the amplified optical signals;
    a feedback loop configured to receive at least one wavelength of amplified emissions from the Thulium-doped fiber span, generate optical feedback signals based on the at least one wavelength of the amplified emissions, and add the optical feedback signals to the input optical signals to provide clamping of a gain in the amplified optical signals; and
    an optical isolator configured to prevent optical signals from traveling into the Thulium-doped fiber span against a direction of the input optical signals;
    wherein the at least one wavelength of the amplified emissions does not overlap with a wavelength of the input optical signals.

2. The optical amplifier system of claim 1 wherein the Thulium-doped fiber span comprises a Fluoride-based Thulium-doped fiber span.

3. The optical amplifier system of claim 1 wherein the Thulium-doped fiber span has a length of about 20 meters.

4. The optical amplifier system of claim 1 wherein the pump system is configured to amplify the S-band of the input optical signals.

5. The optical amplifier system of claim 1 wherein the pump system is configured to forward pump the light onto the Thulium-doped fiber span.

6. The optical amplifier system of claim 1 wherein the pump system comprises an Ytterbium fiber laser.

7. The optical amplifier system of claim 1 wherein the pump system is configured to pump the light having a wavelength of about 1050 nm onto the Thulium-doped fiber span.

8. The optical amplifier system of claim 1 wherein the feedback loop comprises:
    a variable attenuator configured to receive the at least one wavelength of the amplified emissions and control a degree of clamping of the gain in the amplified optical signals by attenuating the at least one wavelength of the amplified emissions to generate the optical feedback signals.

9. The optical amplifier system of claim 1 wherein the gain generated by the optical amplifier system is shifted to longer wavelengths.

10. The optical amplifier system of claim 1 wherein a wavelength range of the gain clamped by the optical amplifier system is greater than 10 nm.

11. A method of operating an optical amplifier system comprised of a Thulium-doped fiber span, a pump system, and a feedback loop, the method comprising the steps of:
    receiving input optical signals into the Thulium-doped fiber span;
    pumping light having a wavelength in the range of 1049 nm to 1060 nm onto the Thulium-doped fiber span with the pump system to amplify the input optical signals to generate amplified optical signals;
    transferring the amplified optical signals from the Thulium-doped fiber span;
    receiving at least one wavelength of amplified emissions from the Thulium-doped fiber span onto the feedback loop, wherein the at least one wavelength of the amplified emissions does not overlap with a wavelength of the input optical signals;

generating optical feedback signals based on the at least one wavelength of the amplified emissions in the feedback loop;

adding the optical feedback signal to the input optical signals in the feedback loop to provide clamping of a gain in the amplified optical signals; and preventing optical signals from traveling into the Thulium-doped fiber span against a direction of the input optical signals.

12. The method of claim 11 wherein the Thulium-doped fiber span comprises a Fluoride-based Thulium-doped fiber span.

13. The method of claim 11 wherein the Thulium-doped fiber span has a length of about 20 meters.

14. The method of claim 11 wherein the step of pumping light onto the Thulium-doped fiber span with the pump system to amplify the input optical signals comprises:

pumping the light onto the Thulium-based fiber span to amplify the S-band of the input optical signals.

15. The method of claim 11 wherein the step of pumping light onto the Thulium-doped fiber span comprises:

forward pumping the light onto the Thulium-doped fiber span.

16. The method of claim 11 wherein the pump system comprises an Ytterbium fiber laser.

17. The method of claim 11 wherein the step of pumping light onto the Thulium-doped fiber span comprises:

pumping the light having a wavelength of about 1050 nm onto the Thulium-doped fiber span.

18. The method of claim 11 wherein the feedback loop includes a variable attenuator and wherein the method further comprises the steps of:

receiving the at least one wavelength of the amplified emissions into the variable attenuator; and controlling a degree of clamping of the gain in the amplified optical signals by attenuating the at least one wavelength of the amplified emissions to generate the optical feedback signals in the variable attenuator.

19. The method of claim 11 wherein the gain generated by the optical amplifier system is shifted to longer wavelengths.

20. The method of claim 11 wherein a wavelength range of the gain clamped by the optical amplifier system is greater than 10 nm.

* * * * *